United States Patent
DeMoss et al.

(10) Patent No.: US 12,287,621 B2
(45) Date of Patent: Apr. 29, 2025

(54) STORAGE DEVICE SELF-HEATING SYSTEM

(71) Applicant: Dell Products L.P., Round Rock, TX (US)

(72) Inventors: Jeffrey James DeMoss, Austin, TX (US); Ricardo V. Dominguez, Georgetown, TX (US); Anthony Gerard Ginty, Cork (IE)

(73) Assignee: Dell Products L.P., Round Rock, TX (US)

( * ) Notice: Subject to any disclaimer, the term of this patent is extended or adjusted under 35 U.S.C. 154(b) by 396 days.

(21) Appl. No.: 17/967,145

(22) Filed: Oct. 17, 2022

(65) Prior Publication Data

US 2024/0126237 A1 Apr. 18, 2024

(51) Int. Cl.
*G05B 19/4155* (2006.01)

(52) U.S. Cl.
CPC ............. *G05B 19/4155* (2013.01); *G05B 2219/50333* (2013.01)

(58) Field of Classification Search
CPC ...... G05B 19/4155; G05B 2219/50333; B23K 37/0443; B23Q 17/005; B23Q 3/06; G06F 1/206
USPC ........................................................ 700/300
See application file for complete search history.

(56) References Cited

U.S. PATENT DOCUMENTS

| | | | |
|---|---|---|---|
| 8,922,928 B2 * | 12/2014 | Powell | G11B 19/046 360/75 |
| 10,021,777 B2 | 7/2018 | Stoev et al. | |
| 2014/0082255 A1 * | 3/2014 | Powell | G06F 3/0619 711/E12.008 |
| 2015/0301932 A1 | 10/2015 | Oh et al. | |
| 2017/0060202 A1 * | 3/2017 | Sundaram | G06F 1/3275 |
| 2017/0071056 A1 * | 3/2017 | Stoev | G11C 7/04 |
| 2020/0081507 A1 * | 3/2020 | Nowell | G01K 3/005 |
| 2020/0286804 A1 * | 9/2020 | Fallin | H01L 23/345 |
| 2021/0216216 A1 * | 7/2021 | Brandt | G06F 3/0653 |
| 2023/0315314 A1 * | 10/2023 | Yang | G06F 3/0634 711/154 |

* cited by examiner

*Primary Examiner* — Chun Cao
(74) *Attorney, Agent, or Firm* — Joseph Mencher

(57) ABSTRACT

A storage device self-heating system includes a storage device having a processing system, a storage subsystem, and at least one heat transfer subsystem coupled between the processing system and the storage subsystem. The storage device determines that a temperature of the storage subsystem is below a temperature threshold and, in response, uses the processing system to perform a plurality of computations that are configured to generate an amount of heat that, when transferred via the heat transfer subsystem(s), raises the temperature of the storage subsystem. The heat transfer subsystem(s) transfer heat generated via the performance of the plurality of computations to the storage subsystem, and when the storage device determines that the temperature of the storage subsystem is above the temperature threshold, it performs at least one storage operation.

20 Claims, 16 Drawing Sheets

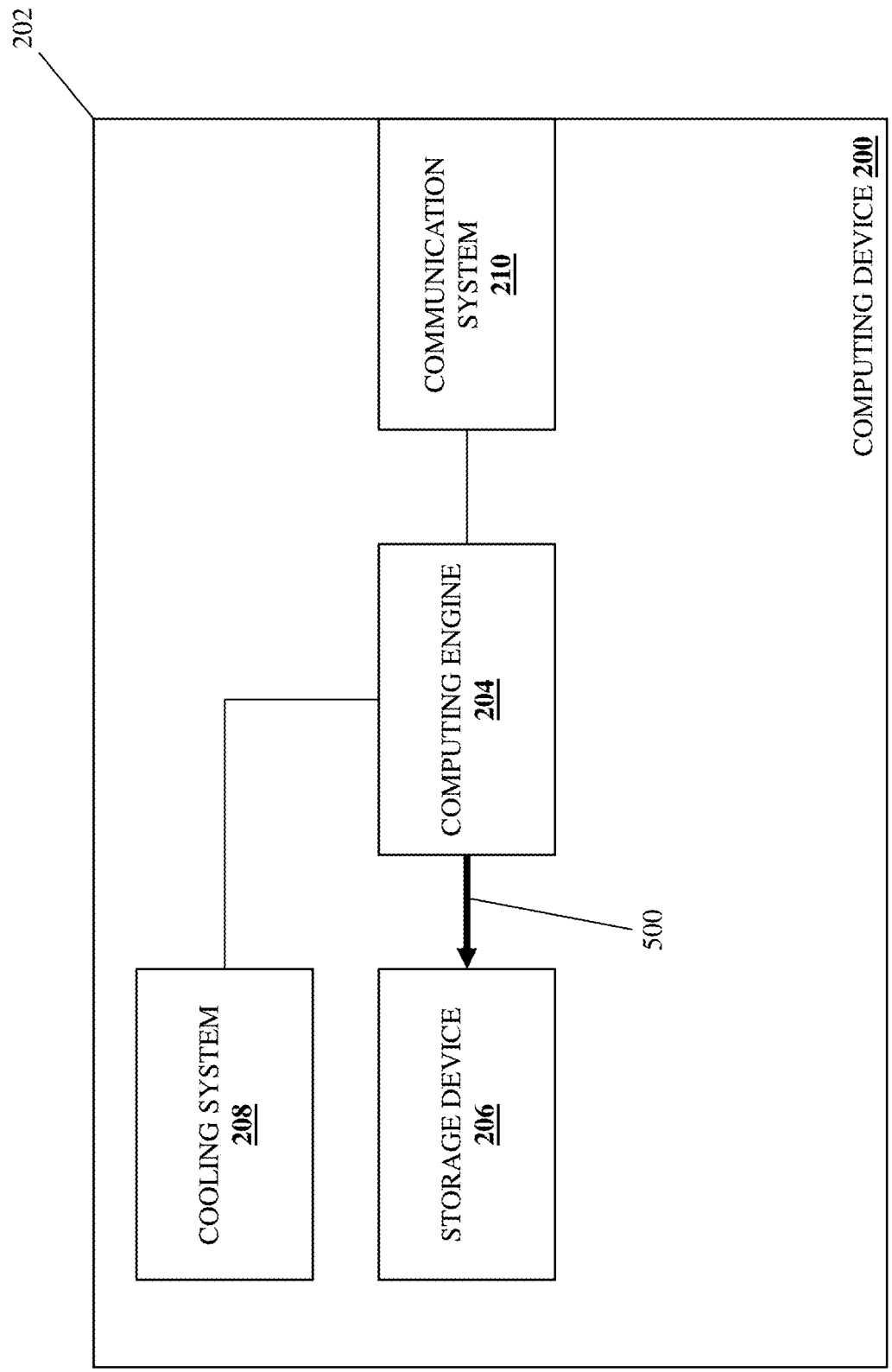

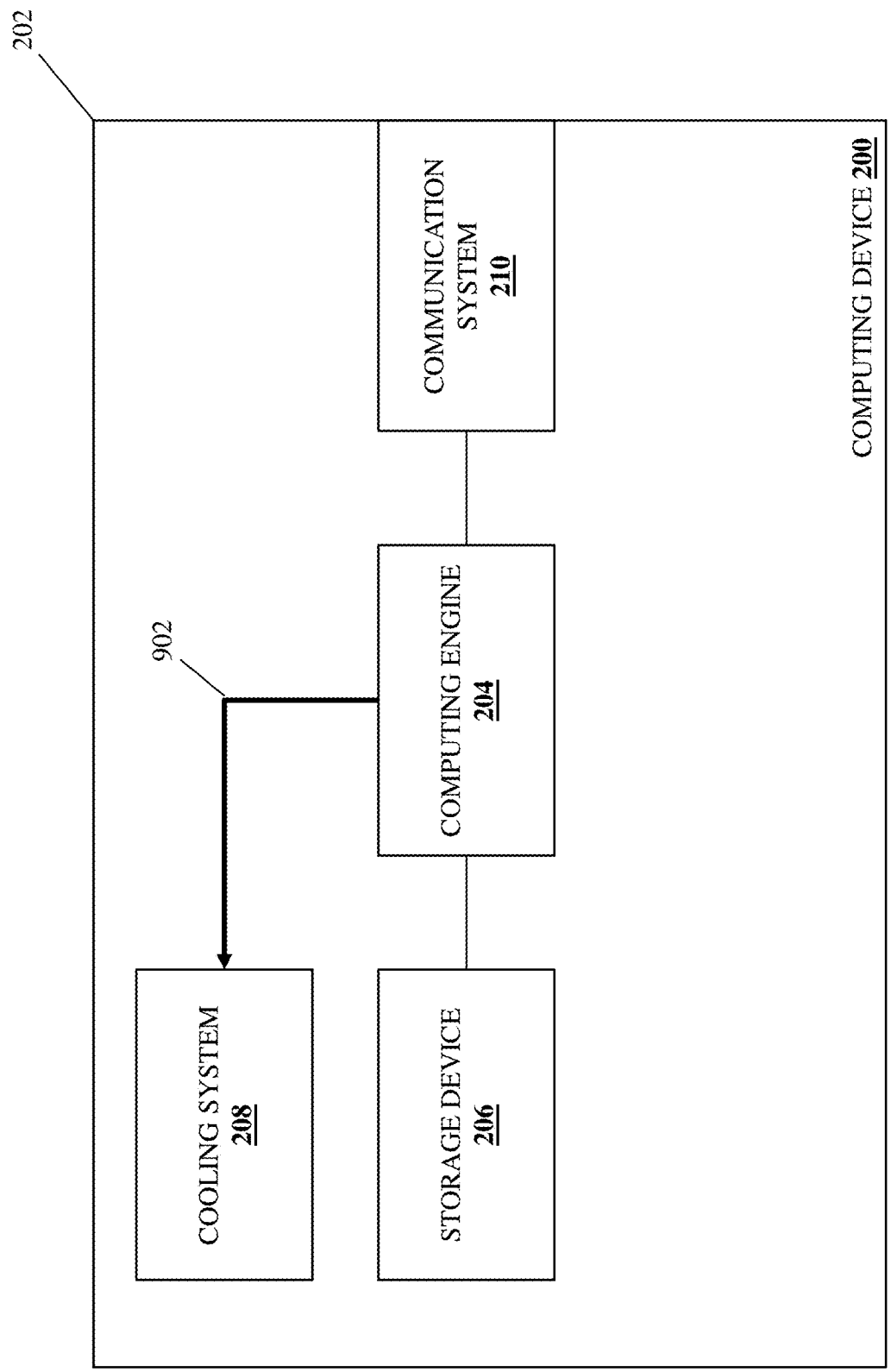

STORAGE DEVICE SELF-HEATING SYSTEM

BACKGROUND

The present disclosure relates generally to information handling systems, and more particularly to self-heating a storage device in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as server devices, desktop computing devices, laptop/notebook computing devices, tablet computing devices, mobiles phones, and/or other computing devices known in the art include storage devices such as, for example, Solid State Drive (SSD) storage devices that are utilized to store data for those computing devices. In most situations, the computing devices discussed above are expected to operate in temperatures above 0° C. However, situations may arise where the computing devices are subject to temperatures where at least some of their components have not historically been designed to operate, which can raise some issues.

For example, computing devices utilized in telecommunications (Telco) applications (e.g., $5^{th}$ generation (5G) Telco applications) and/or other "fresh air" compute applications known in the art may be located in regions where either the temperature is below 0° C. on average, or at some point will reach temperatures below 0° C. While some components utilized in such computing device such as, for example, Dual Data Rate (DDR) memory components, Central Processing Unit (CPU) components, and/or other components may be configured to operate in sub-0° C. temperature (e.g., between −20° C. to 0° C.), components such as SSD storage devices that utilize NAND storage technologies can experience issues when utilized at such temperatures.

As will be appreciated by one of skill in the art in possession of the present disclosure, storage operations such as the programming/writing of data to a NAND storage subsystem and subsequently reading that data back from the NAND storage subsystem are prone to errors when performed below 0° C. or across 0° C. For example, when program/write operations are performed to store data using NAND storage subsystems in relatively cold temperatures (e.g., lower than 0° C.), errors will occur when that data is subsequently read back from the NAND storage subsystem after it has heated up (e.g., above 0° C.). Due to these issues, conventional NAND storage subsystems are typically limited to operating between 0° C. and 70° C. (e.g., via write prevention subsystems that prevent write operations below 0° C.). Conventional solutions to such issues include providing external heaters with the SSD storage device or utilizing storage subsystems that are configured to operate below 0° C., each of which increases costs.

Accordingly, it would be desirable to provide a storage device that addresses the issues discussed above.

SUMMARY

According to one embodiment, an Information Handling System (IHS) includes a storage processing system; and a storage memory system that is coupled to the storage processing system and that includes instructions that, when executed by the storage processing system, cause the storage processing system to provide a self-heating engine that is configured to: determine that a temperature of a storage subsystem is below a temperature threshold; perform, using the storage processing system and in response to determining that the temperature of the storage subsystem is below the temperature threshold, a plurality of computations that are configured to generate an amount of heat that, when transferred via at least one heat transfer subsystem coupled to each of the storage processing system and the storage subsystem, will raise the temperature of the storage subsystem; determine that the temperature of the storage subsystem is above the temperature threshold in response to the at least one heat transfer subsystem transferring, from the storage processing system to the storage subsystem, first heat generated in response to the processing system performing the plurality of computations; and perform, in response to determining that the temperature of the storage subsystem is above the temperature threshold, at least one storage operation.

BRIEF DESCRIPTION OF THE DRAWINGS

FIG. 5A is a schematic view illustrating an embodiment of the computing device of FIG. 2 operating during the method of FIG. 4.

FIG. 9B is a schematic view illustrating an embodiment of the computing device of FIG. 2 operating during the method of FIG. 4.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
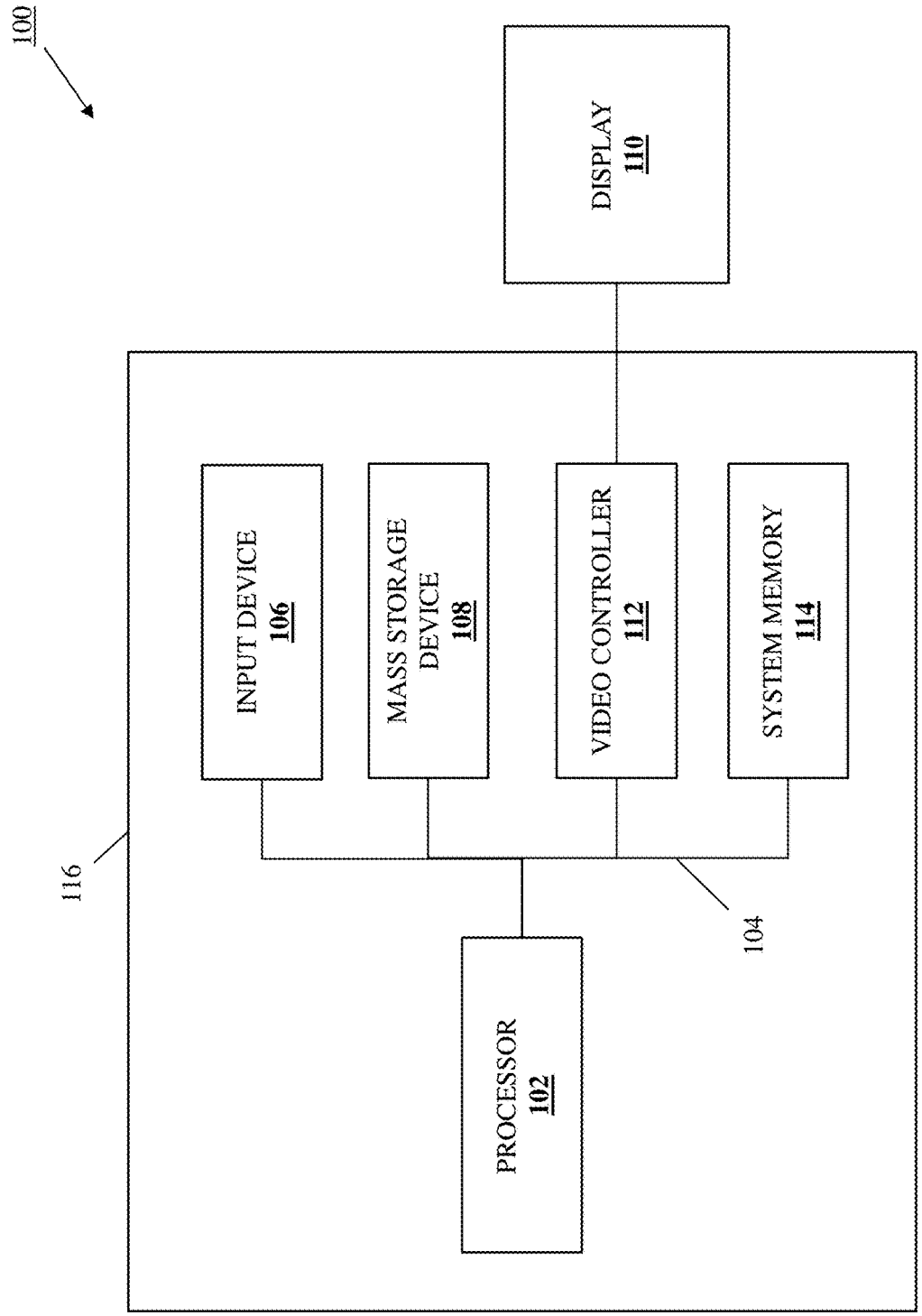
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
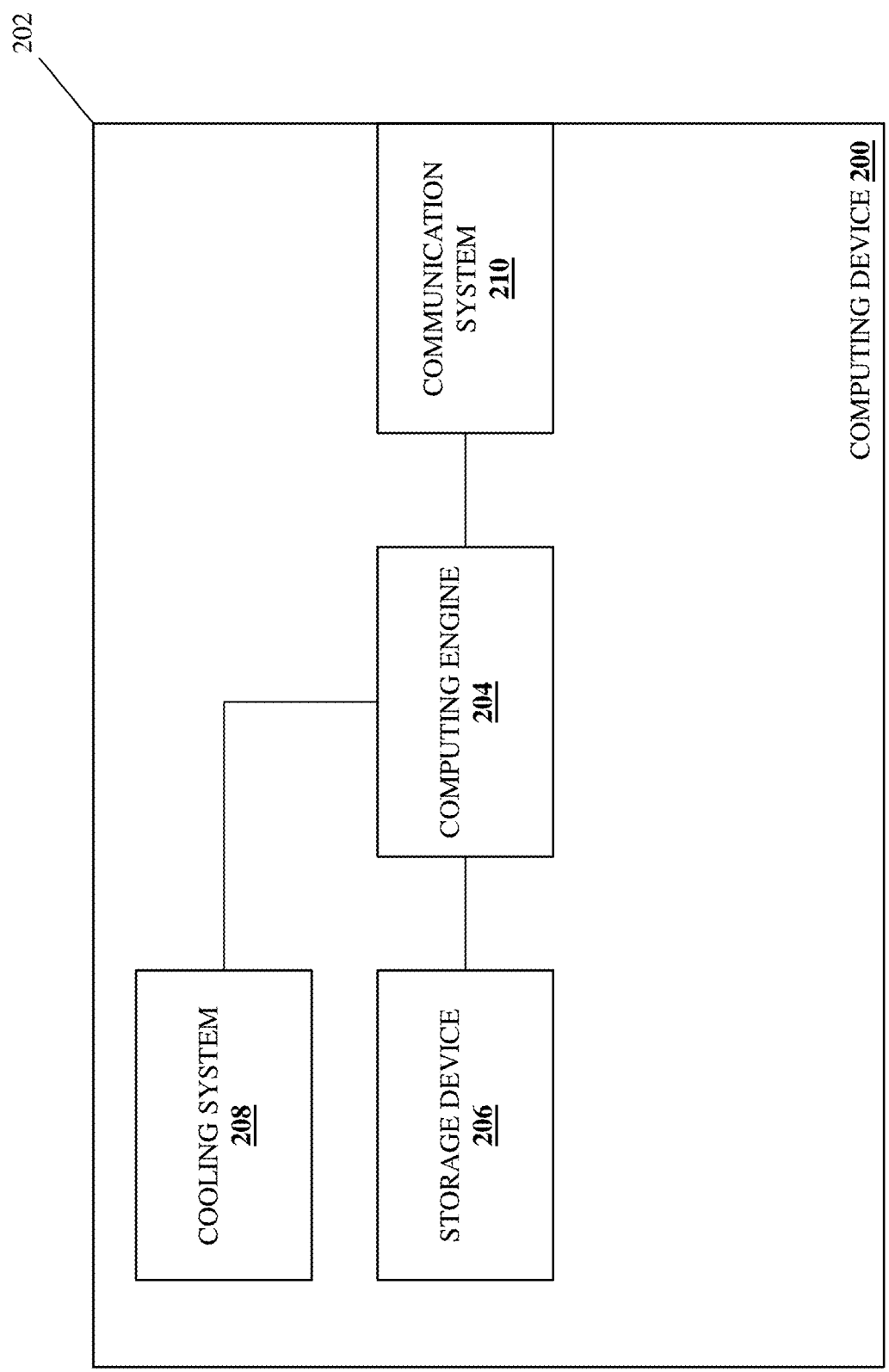
FIG. 2 is a schematic view illustrating an embodiment of a computing device that may include a storage device self-heating system provided according to the teachings of the present disclosure.

Referring now to FIG. 2, an embodiment of a computing device 200 is illustrated that may include storage devices utilizing the storage device self-heating system of the present disclosure. In an embodiment, the computing device 200 may be provided by the IHS 100 discussed above with reference to FIG. 1 and/or may include some or all of the components of the IHS 100, and in a specific example may be provided by a server device. However, while illustrated and discussed as being provided by a server device, one of skill in the art in possession of the present disclosure will recognize that the functionality of the computing device 200 discussed below may be provided by other devices (e.g., storage systems, desktop computing devices, laptop computing devices, table computing devices, mobile phones, etc.) that are configured to operate similarly as discussed below. Furthermore, in some embodiments, storage devices utilizing the storage device self-heating system of the present disclosure may be provided by "external" storage devices that are separate from computing devices like that illustrated in FIG. 2. In the illustrated embodiment, the computing device 200 includes a chassis 202 that houses the components of the computing device 200, only some of which are illustrated and discussed below. For example, the chassis 202 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a computing engine 204 that is configured to perform the functionality of the computing engines and/or computing devices discussed below.

The chassis 202 may also house a storage device 206 that is coupled to the computing engine 204 (e.g., via a coupling between the storage device 206 and the processing system) and that, in some embodiments, may be provided by a Solid State Drive (SSD) storage device that utilizes NAND storage technology. However, one of skill in the art in possession of the present disclosure will appreciate that storage devices provided according to the teachings of the present disclosure may be provided by other types of storage devices utilizing other types of storage technology while remaining within the scope of the present disclosure. In an embodiment, the chassis 202 may also house a cooling system 208 that is configured to cool the storage device 206 (and/or other components in the chassis 202 of the computing device 200). For example, the cooling system 208 may be provided by fan systems, liquid cooling systems, and/or other cooling systems that one of skill in the art in possession of the present disclosure would recognize as being included in a computing device.

The chassis 202 may also house a communication system 210 that is coupled to the computing engine 204 (e.g., via a coupling between the communication system 210 and the processing system) and that may be provided by a Network Interface Controller (NIC), wireless communication systems (e.g., BLUETOOTH®, Near Field Communication (NFC)

components, WiFi components, etc.), and/or any other communication components that would be apparent to one of skill in the art in possession of the present disclosure. However, while a specific computing device 200 has been illustrated and described, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the functionality discussed below, while remaining within the scope of the present disclosure as well.

Figure 3A:
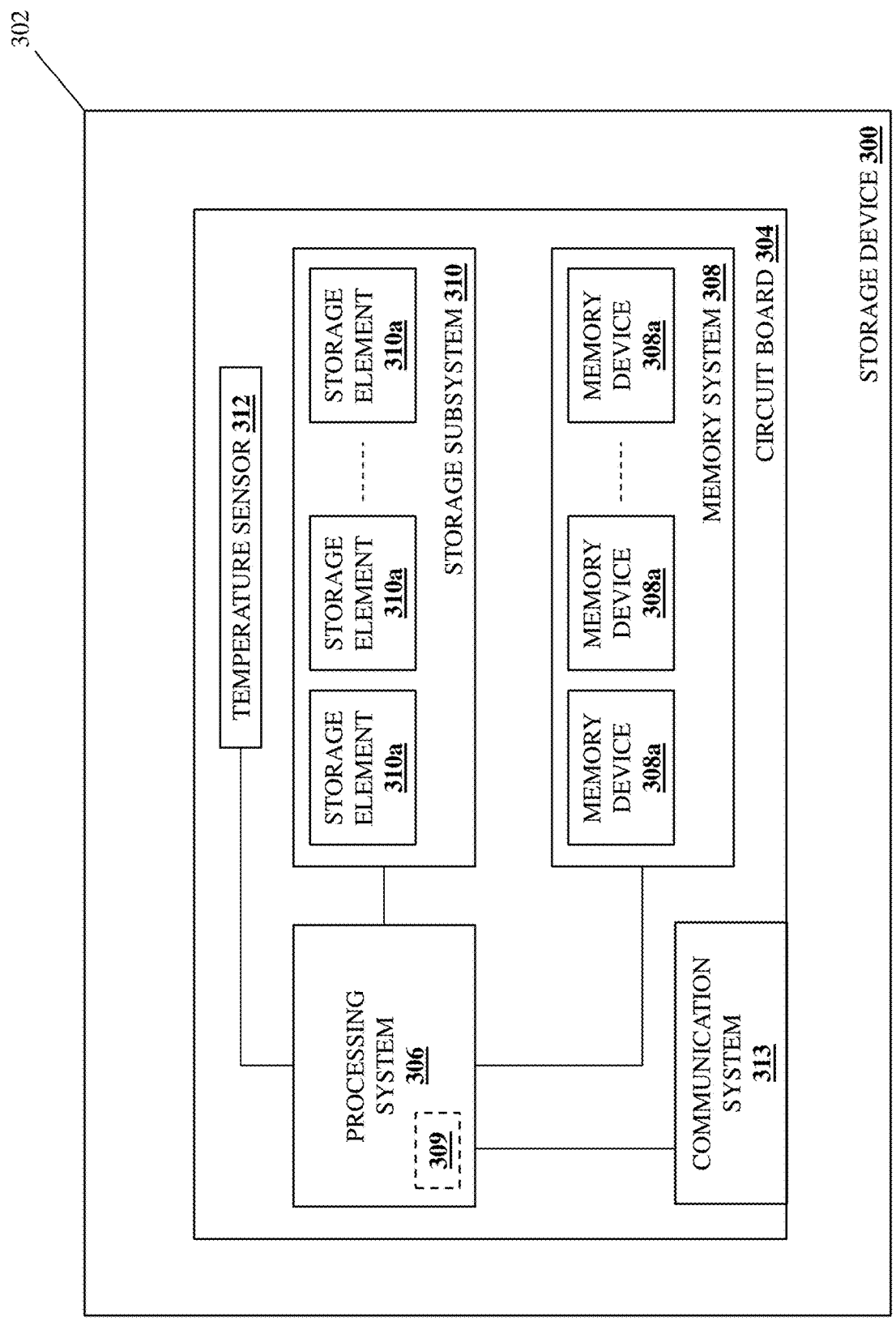
FIG. 3A is a schematic top view illustrating an embodiment of a storage device that may include the storage device self-heating system of the present disclosure and that may be provided in the computing device of FIG. 2.

Referring now to FIG. 3A, an embodiment of a storage device 300 is illustrated that may provide the storage device 206 discussed above with reference to FIG. 2. As such, the storage device 300 may be provided in the IHS 100 discussed above with reference to FIG. 1 (e.g., as the storage device 108), and in specific examples may be provided by an SSD storage device that utilizes NAND storage technology. However, while illustrated and discussed as being provided by an SSD storage device, one of skill in the art in possession of the present disclosure will recognize that the storage device discussed below may be provided by types of storage devices utilizing other types of storage technology while remaining within the scope of the present disclosure as well. In the illustrated embodiment, the storage device 300 includes a chassis 302 that houses the components of the storage device 300, only some of which are illustrated and discussed below.

For example, the chassis 302 may house a circuit board 304 that is configured to support the components of storage device 300, only some of which are illustrated in FIG. 3A. For example, in the illustrated embodiment, a processing system 306 is mounted to the circuit board 304 and may be provided by a System on Chip (SoC), storage device Central Processing Unit (CPU), a storage device controller, and/or any of a variety of other storage processing systems that would be apparent to one of skill in the art in possession of the present disclosure. The circuit board also supports a memory system 308 that that is coupled to the processing system 306 (or included in the processing system 306 in other, non-illustrated embodiments), and that includes memory devices 308a that may store any of a variety of data or other information utilized by the processing system 306. For example, the memory devices 308a may include instructions that, when executed by the processing system 306, cause the processing system 306 to provide a storage device self-heating engine 309 that is configured to perform the functionality of the storage device self-heating engines and/or processing systems discussed below.

The circuit board 304 also supports a storage subsystem 310 that is coupled to the processing system 306 and that includes storage elements 310a that as discussed above may be provided by SSD storage device utilizing NAND storage technology, but that may be provided using other storage technologies while remaining within the scope of the present disclosure as well. The circuit board also supports a temperature sensor 312 that is coupled to the storage device self-heating engine 309 (e.g., via a coupling between the temperature sensor 312 and the processing system 306). As will be appreciated by one of skill in the art in possession of the present disclosure, while the temperature sensor 312 is illustrated and described below as being located within the chassis 302 of the storage device 300, the temperature sensor 312 may be located within the storage subsystem 310, outside of the chassis 302 of the storage device 300 (e.g., anywhere in the chassis 202 of the computing device 200), outside the chassis 202 of the computing device 200, etc. Furthermore, as discussed below, temperatures identified via the temperature sensor 312 may instead be identified via other temperature identification subsystems, in which case the temperature sensor 312 may be omitted. The chassis 302 may also house a communication system 313 that is coupled to the storage device self-heating engine 309 (e.g., via a coupling between the communication system 313 and the processing system) and that may be provided by any of a variety of storage device communication components that would be apparent to one of skill in the art in possession of the present disclosure.

Figure 3B:
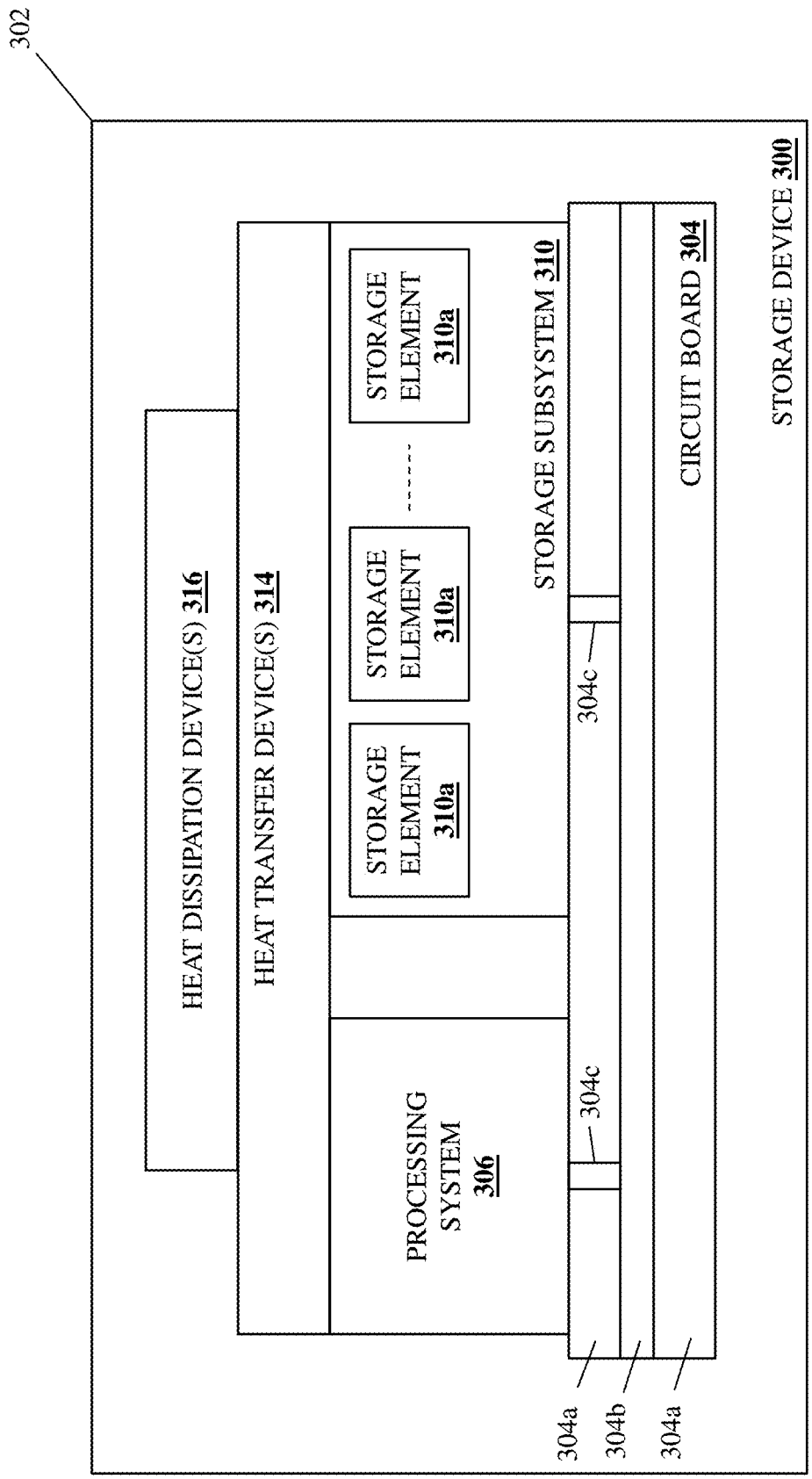
FIG. 3B is a schematic side view illustrating an embodiment of the storage device of FIG. 3A.

Referring now to FIG. 3B, an embodiment of a schematic side-view of storage device 300 of FIG. 3A is illustrated in order to illustrate examples of heat transfer subsystems that may be provided in the chassis 302 of the storage device 300. The chassis 302 illustrated in FIG. 3B may house all of the components discussed above with reference to FIG. 3A, including the memory system 308, the temperature sensor 312, and the communication system 313 that are not visible in FIG. 3B. In the illustrated embodiment, a first heat transfer subsystem is illustrated as being provided in the circuit board 304. For example, the circuit board 304 may include a plurality of insulating layers 304a, one or more conductive layers 304b, and a plurality of vias 304c that are coupled to the processing system 306 and the storage subsystem 310. As will be appreciated by one of skill in the art in possession of the present disclosure, the circuit board 304 may include conductive layers 304b provided between insulating layers 304a and coupled to components on the circuit board 304 using vias 304c in order to provide for communication between those components, the transmission of power between those components, and/or other circuit board functionality known in the art. Furthermore, while the circuit board 304 illustrated in FIG. 3B provides a vastly simplified schematic that illustrates a single conductive layer 304b and respective single vias 304c connected to each of the processing system 306 and the storage subsystem 310, one of skill in the art in possession of the present disclosure will appreciate how circuit boards may include many more conductive layers and many more vias connected to components while remaining within the scope of the present disclosure.

In the illustrated embodiment, a second heat transfer subsystem is illustrated as being provided by one or more heat transfer devices 314 that engage the processing system 306 and the storage subsystem 310. For example, the heat transfer device(s) 314 may be provided by heat spreaders, heat pipes, and/or other heat transfer devices that would be apparent to one of skill in the art in possession of the present disclosure. Furthermore, in the illustrated embodiment, one or more heat dissipation device(s) 316 engage the second heat transfer device(s) 314, and may be provided by heat sinks and/or other heat dissipation devices that would be apparent to one of skill in the art in possession of the present disclosure. As will be appreciated by one of skill in the art in possession of the present disclosure, in some embodiments the processing system 306 and the storage subsystem 310 may be provided on the circuit board 304 in relatively close proximity.

For example, the storage device 300 may be designed with the processing system 306 and the storage subsystem 310 spaced apart a distance that allows the heat transfer subsystems to transfer an amount of heat from the processing system 306 to the storage subsystem 310 that will provide the self-heating functionality described below, which one of skill in the art in possession of the present disclosure will appreciate may depend on the heat generation capabilities of the processing system 306, the heat transfer capabilities of the heat transfer subsystems, and/or any other factors that would be apparent to one of skill in the art in possession of the present disclosure. However, while a specific storage device 300 has been illustrated and described, one of skill in the art in possession of the present disclosure will recognize that storage devices (or other devices operating according to the teachings of the present disclosure in a manner similar to that described below for the storage device 300) may include a variety of components and/or component configurations for providing conventional storage device functionality, as well as the functionality discussed below, while remaining within the scope of the present disclosure as well.

Figure 4:
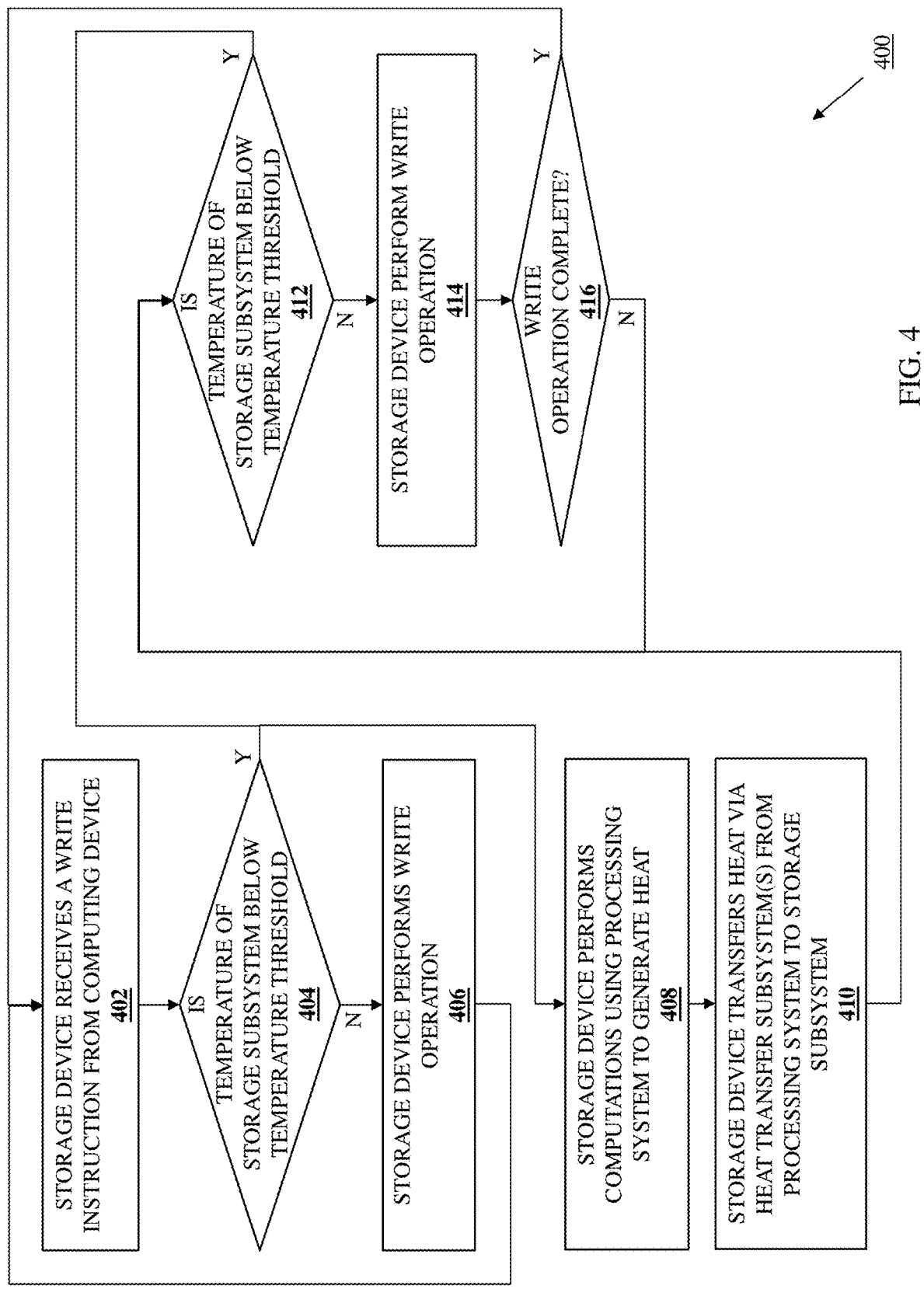
FIG. 4 is a flow chart illustrating an embodiment of a method for self-heating a storage device.

Referring now to FIG. 4, an embodiment of a method 400 for self-heating a storage device is illustrated. As discussed below, the systems and methods of the present disclosure provide a storage device that, in the event a write instruction is received when its storage subsystem is below a temperature threshold, performs a plurality of computations using its processing system to generate heat that is then transferred via its heat transfer subsystem to heat the storage subsystem above the temperature threshold. For example, the storage device self-heating system of the present disclosure may include a storage device having a processing system, a storage subsystem, and at least one heat transfer subsystem coupled between the processing system and the storage subsystem. The storage device determines that a temperature of the storage subsystem is below a temperature threshold and, in response, uses the processing system to perform a plurality of computations that are configured to generate an amount of heat that, when transferred via the heat transfer subsystem(s), raises the temperature of the storage subsystem. The heat transfer subsystem(s) transfer heat generated via the performance of the plurality of computations to the storage subsystem, and when the storage device determines that the temperature of the storage subsystem is above the temperature threshold, it performs at least one storage operation. As such, storage devices provided in relatively extreme cold environments (e.g., below OC) may use their existing processing systems and heat transfer subsystems to generate heat and transfer that heat to their storage subsystems in order to heat those storage subsystems to a temperature threshold prior to performing a write operation on those storage subsystems in order to reduce errors that may otherwise occur with data written at such relatively extreme cold environments.

Figure 5B:
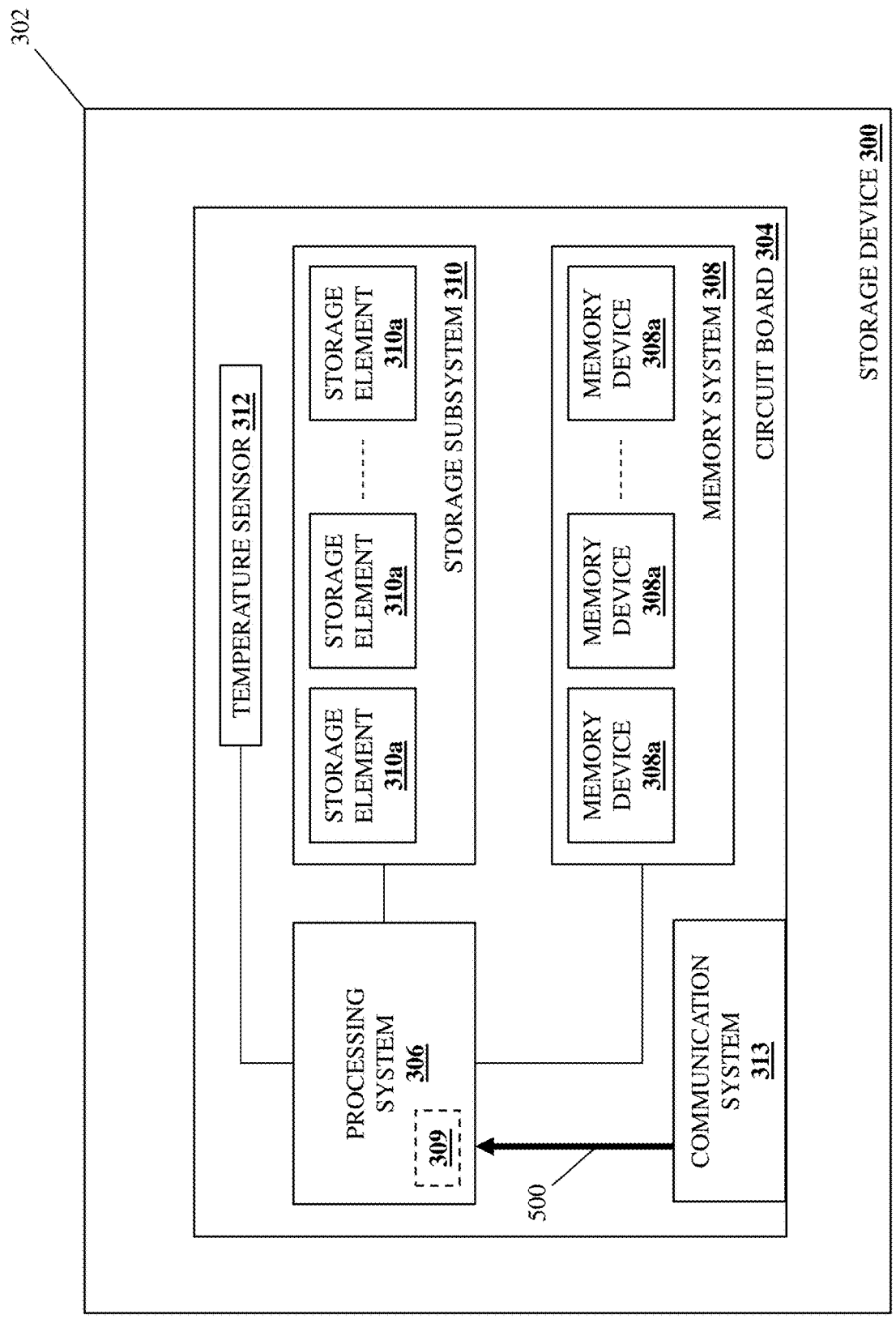
FIG. 5B is a schematic view illustrating an embodiment of the storage device of FIG. 3A operating during the method of FIG. 4.

The method 400 begins at block 402 where a storage device receives a write instruction from a computing device. With reference to FIGS. 5A and 5B, in an embodiment of block 402, the computing engine 204 in the computing device 200 may perform write instruction provisioning operations 500 that may include generating a write instruction and providing that write instruction to the storage device 206. As will be appreciated by one of skill in the art in possession of the present disclosure, the write instruction may be generated by the computing engine 204 in response to a command received from a user, a command received from an application, a command received through the communication system 210 and via a network, and/or in a variety of other write instruction generation scenarios known in the art. As such, the storage device self-heating engine 309 provided by the processing system 306 may receive the write instruction via its communication system 313 as part of the write instruction provisioning operations 500. However, while the storage device self-heating engine 309 is illustrated and described as receiving the write instruction from the computing engine 204 in the computing device 200, one of skill in the art in possession of the present disclosure will appreciate how write instructions may be received from other entities, or generated internally by one or more subsystems in the storage device 300 (e.g., as part of background operations in the storage device 206/300), while remaining within the scope of the present disclosure as well.

Figure 6A:
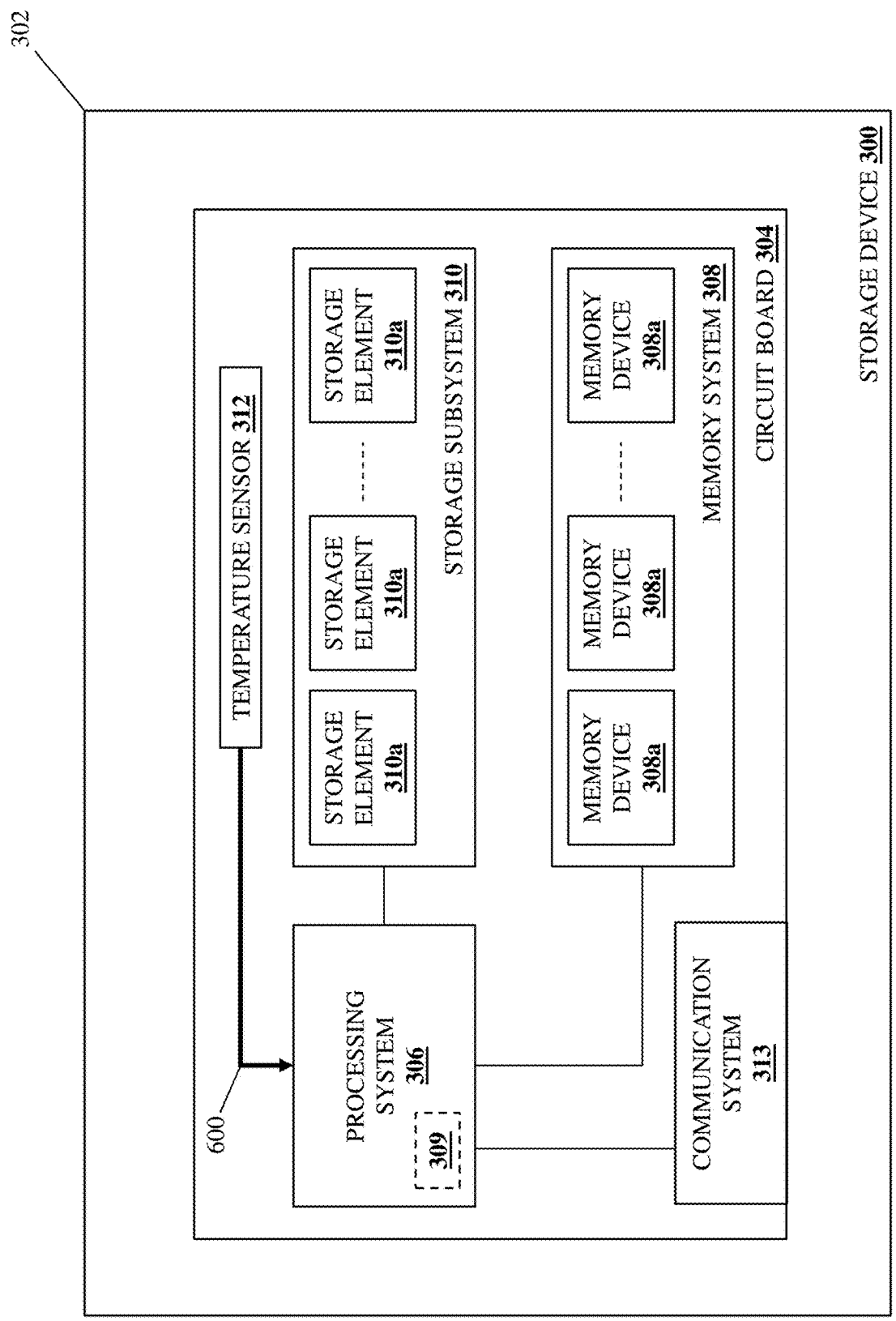
FIG. 6A is a schematic view illustrating an embodiment of the storage device of FIG. 3A operating during the method of FIG. 4.

The method 400 then proceeds to decision block 404 where it is determined whether a temperature of a storage subsystem is below a temperature threshold. With reference to FIG. 6A, in an embodiment of decision block 404, the storage device self-heating engine 309 provided by the processing system 306 may perform temperature determination operations 600 that may include identifying a temperature using the temperature sensor 312 and determining whether that temperature is below a temperature threshold for performing the write operation. For example, the temperature sensor 312 may be provided using any of a variety of temperature sensing technologies that one of skill in the art in possession of the present disclosure would recognize as reporting temperatures to the storage device self-heating engine 309 (or allowing the storage device self-heating engine 309 to retrieve those temperatures).

However, while the storage device self-heating engine 309 is illustrated and described as performing the temperature determination operations 600 using the temperature sensor 312 discussed above, one of skill in the art in possession of the present disclosure will appreciate how the temperature determination operation 600 may be performed by the storage device self-heating engine 309 using other temperature information sources known in the art. For example, the storage device self-heating engine 309 may identify temperature at decision block 404 using internet-based temperature information sources (e.g., a weather application or website), user-supplied temperature information, and/or other temperature information that would be apparent to one of skill in the art in possession of the present disclosure.

One of skill in the art in possession of the present disclosure will appreciate that the storage device self-heating system of the present disclosure is generally concerned with the temperature of the storage elements 310a in the storage subsystem 310 when operating to reduce errors that may occur when writing data below a threshold temperature. As such, in some embodiments, the temperature determined at decision block 404 may be a temperature of the storage elements 310a/storage subsystem 310. However, one of skill in the art in possession of the present disclosure will also appreciate that the temperature information available to the storage device 300 may not provide a specific temperature of the storage elements 310a/storage subsystem 310, and rather may provide an ambient temperature of the location at which the computing device 200/storage device 300 are located, a temperature within the chassis 202 of the computing device 200, a temperature within the chassis 302 of the storage device 300, and/or other temperatures that one of skill in the art in possession of the present disclosure in the art in possession of the present disclosure would appreciate as providing the benefits discussed below.

In an embodiment, the determination at decision block 404 may include comparing the temperature identified at decision block 404 with a temperature threshold for performing the write operation. To provide a specific example, the temperature threshold for performing a write operation may be set at least 0 degrees Celsius (0° C.), although one of skill in the art in possession of the present disclosure will appreciate how temperature ranges may be utilized as the temperature threshold (e.g., −5° C. to 5° C.), and/or how temperature thresholds may differ depending on storage devices, storage technologies, and/or other temperature-dependent factors that one of skill in the art in possession of the present disclosure would recognize as being present in the storage devices described herein.

Figure 6B:
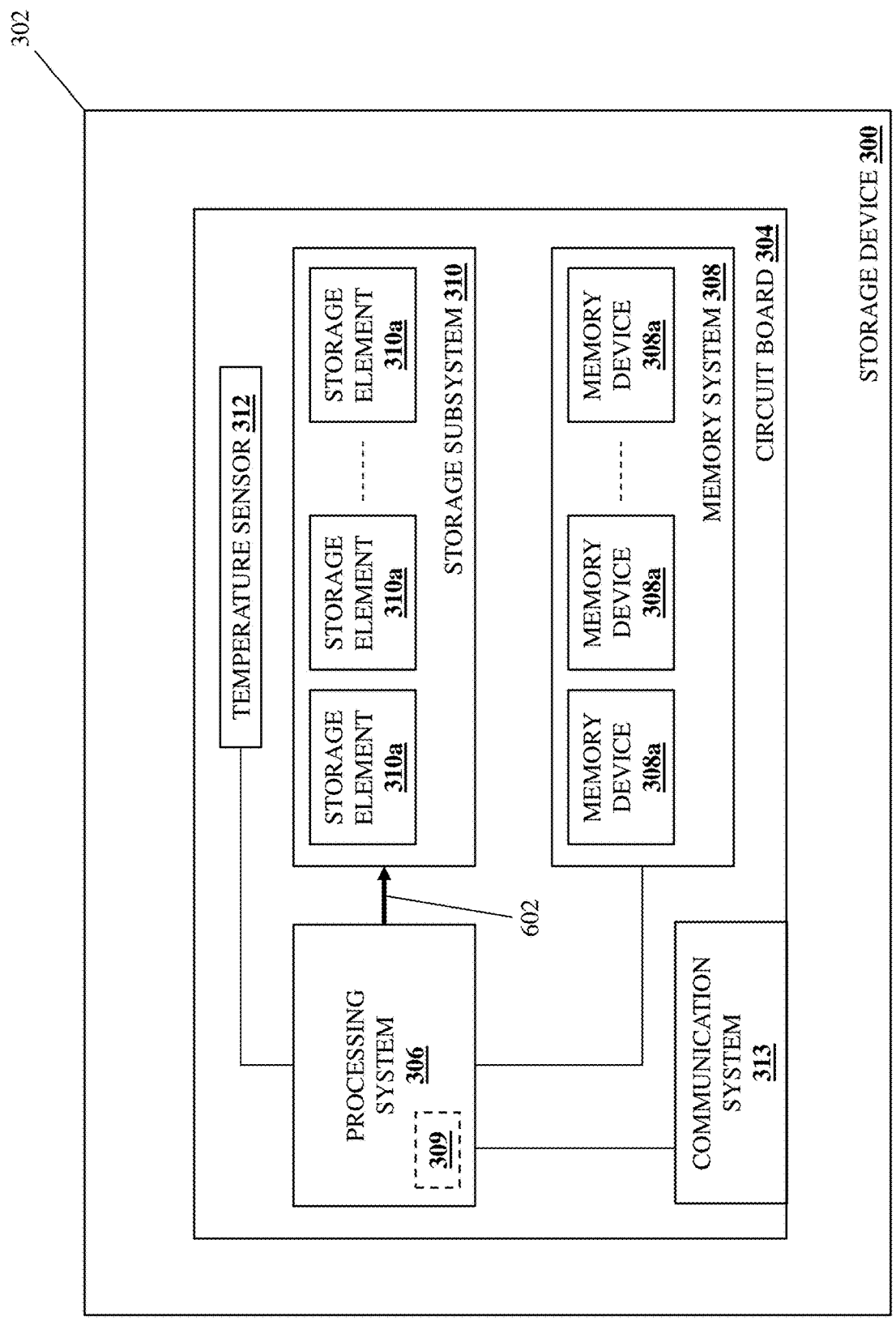
FIG. 6B is a schematic view illustrating an embodiment of the storage device of FIG. 3A operating during the method of FIG. 4.

If, at decision block 404, it is determined that the temperature of the storage subsystem is not below the temperature threshold, the method 400 proceeds to block 406 where the storage device performs the write operation. With reference to FIG. 6B, in an embodiment of block 406 and in response to determining that the temperature of the storage subsystem 310 is not below the temperature threshold for the write operation, the processing system 306 may perform a write operation 602 that may include writing data to the storage subsystem 310. As will be appreciated by one of skill in the art in possession of the present disclosure, the writing of the data as part of the write operation 602 may be defined by the write instruction that was received at block 402. Furthermore, as discussed above, while the write operation 602 is described as being performed in response to write instructions from the computing engine 204, write operations may be performed in response to write instructions received from other entities, or generated internally by one or more subsystems in the storage device 300 (e.g., as part of background operations in the storage device 206/300), while remaining within the scope of the present disclosure as well. The method 400 may then return to block 402. As such, the method 400 may loop such that write instructions are received and corresponding write operations are performed as long as the temperature of the storage elements/storage subsystem/storage device is not below the temperature threshold.

Figure 7:
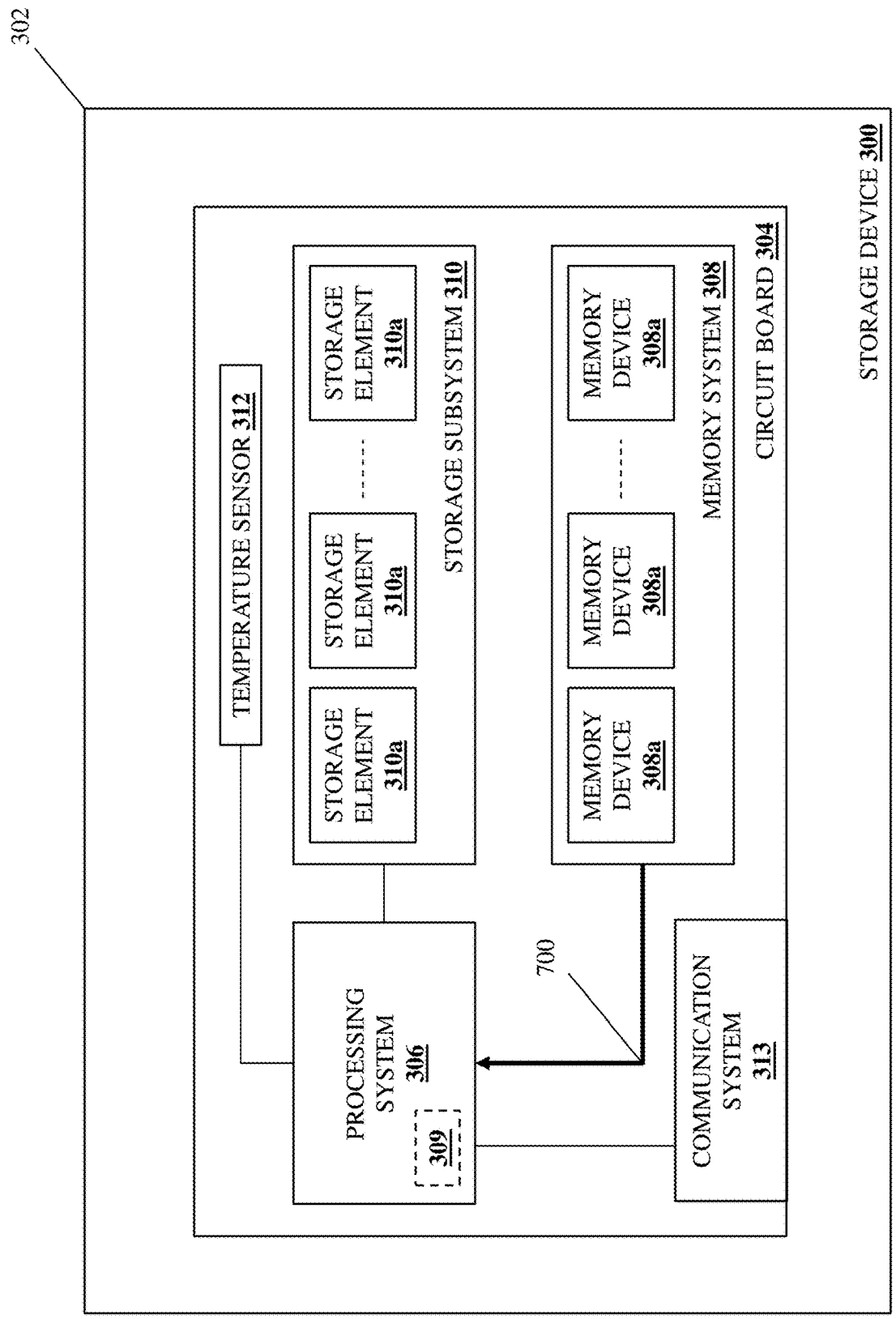
FIG. 7 is a schematic view illustrating an embodiment of the storage device of FIG. 3A operating during the method of FIG. 4.

If, at decision block 404, it is determined that the temperature of the storage subsystem is below the temperature threshold, the method 400 proceeds to block 408 where the storage device performs computations using a processing system to generate heat. In an embodiment, if it is determined that the temperature of the storage subsystem is below the temperature threshold at decision block 404, the storage device self-heating engine 309 may alert the computing engine 204 that the storage subsystem 310 is not ready for the performance of the write operation instructed via the write instruction. Furthermore, in an embodiment of block 408 and in response to determining that the temperature of the storage subsystem 310 is below the temperature threshold for a write operation, the storage device self-heating engine 309 included in the processing system 306 may perform computation information retrieval operations 700 that may include retrieving computation information from one or more of the memory devices 308a in the memory system 308, as illustrated in FIG. 7. In an embodiment, the computation information may include code, instructions, and/or any other computation information that is configured, when executed by the processing system 306, to cause the performance of mathematical computations, algorithmic computations and/or other computations that would be apparent to one of skill in the art in possession of the present disclosure. In a specific embodiment, the computation information may be configured, when executed by the processing system 306, to maximize the power draw and temperature production by the processing system 306.

For example, the computation information retrieved at block 408 may be configured, when executed by the processing system 306, to cause the performance of "tight loop" computations. As would be appreciated by one of skill in the art in possession of the present disclosure, processing system manufacturers or third parties may develop tight loop computations like those describe herein that are conventionally utilized to "exercise" or otherwise operate the processing system 306 for the purposes of measuring the thermal performance of the processing system 306, and knowledge of the particular architecture of the processing system 306 and/or the device in which it is located may be used to develop tight loop computations that maximize the power draw of the processing system 306 in order to maximize the heat produced by that processing system 306. For example, tight loop computations may include a relatively small instruction set that is executed repeatedly. However, while specific computation information has been described, one of skill in the art in possession of the present disclosure will appreciate how other computation information that causes similar operation of the processing system 306 (e.g., cryptocurrency mining computation information that, when executed by the processing system, provides for the "mining" of cryptocurrency (e.g., Bitcoin)) will fall within the scope of the present disclosure as well.

In an embodiment of block 408 and in response to retrieving the computation information, the storage device self-heating engine 309 included in the processing system 306 may execute the computation information, which as discussed above may include the execution of code, instructions, and/or any other computation information in order to cause the performance of mathematical computations, algorithmic computations and/or other computations that would be apparent to one of skill in the art in possession of the present disclosure. As discussed om the specific examples above, the execution of the computation information may include the performance of "tight loop" computations, which is one example of computation information that is configured, when executed by the processing system 306, to maximize the power draw and temperature production by the processing system 306.

Similarly as discussed above, the performance of tight loop computations may include the repeated execution of a relatively small instruction set that is conventionally utilized to "exercise" or otherwise operate the processing system 306 for the purposes of measuring the thermal performance of the processing system 306, and thus the performance of the tight loop computations at block 408 may maximize the power draw of the processing system 306 in order to maximize the heat produced by that processing system 306. As such, in response to performing the plurality of "tight loop" computations, the processing system 306 may generate heat. For example, the performance of "tight loop" computations may cause the processing system 306 to consume between 5-10 watts of power (e.g., under full loading) and generate an associated amount of heat that would be apparent to one of skill in the art in possession of the present disclosure. As such, the processing system 306 may be configured to perform the computations at block 408 autonomously in response to determining that the storage subsystem is below the temperature threshold and without receiving an instruction from the computing engine 204 to do so.

Figure 8:
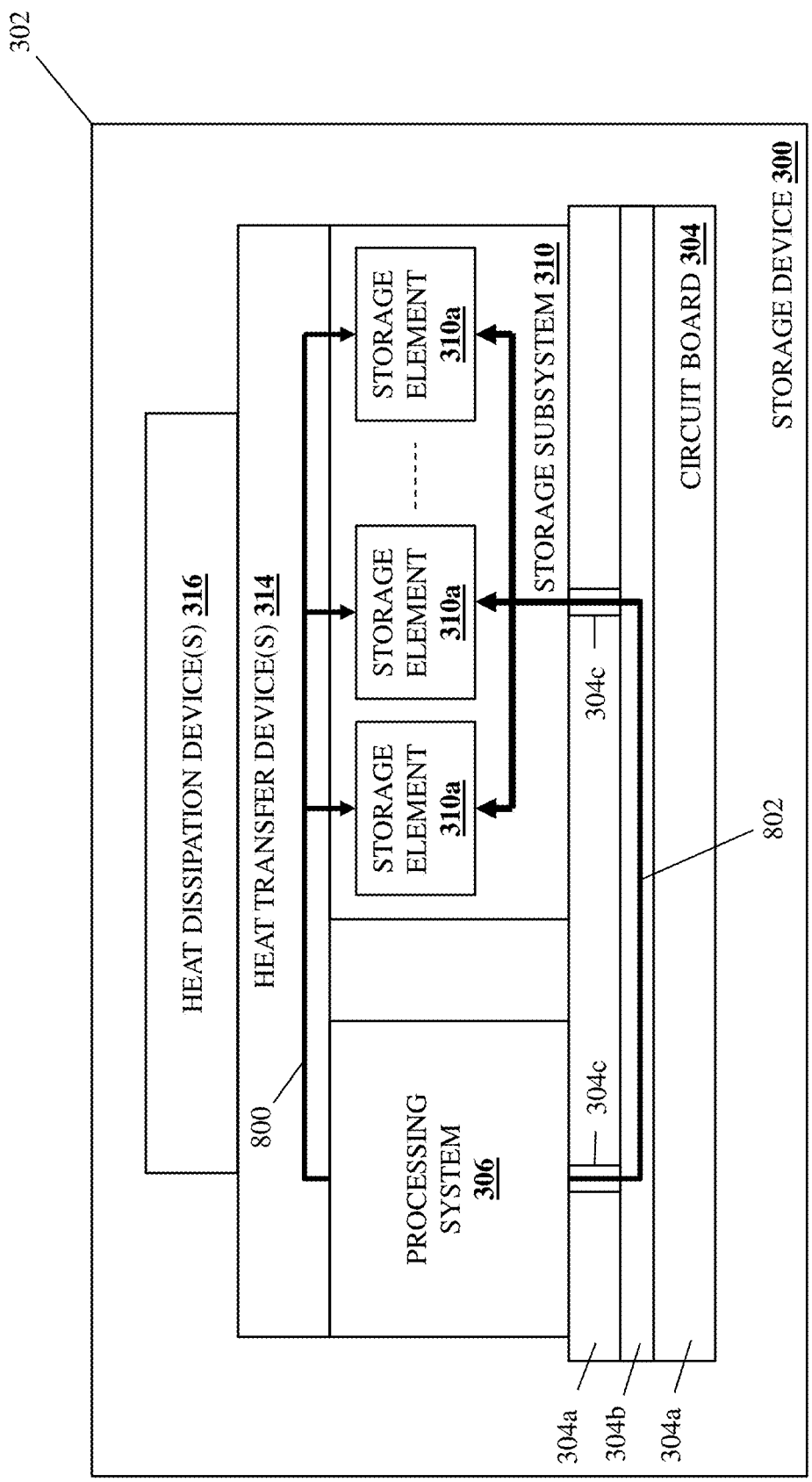
FIG. 8 is a schematic view illustrating an embodiment of the storage device of FIG. 3B operating during the method of FIG. 4.

The method 400 the proceeds to block 410 where the storage device transfers heat via one or more heat transfer subsystems from the processing system to the storage subsystem. As illustrated in FIG. 8, in an embodiment of block 410 and in response to performing the computations at block 408, the processing system 306 generates heat that is transferred via the heat transfer subsystem(s) in the storage device 300. In the illustrated example, first heat 800 generated by the processing system 306 in response to performing the computations may be transferred via the heat transfer device(s) 314 to any of the storage elements 310*a* in the storage subsystem 310. Furthermore, in the illustrated example, second heat 802 generated by the processing system 306 in response to performing the computation operations may be transferred through the vias 304*c* and the conductive layer(s) 304*b* to any of the storage elements 310*a* in the storage subsystem 310.

However, while a specific example is illustrated in which two heat transfer subsystems (i.e., the heat transfer device(s) 314 and the circuit board 304) are used to transfer heat generated by the processing system 306, in other examples, either of those heat transfer subsystems may be omitted. As such, the heat transfer at block 410 may be performed solely by the heat transfer device(s) 314, or solely by the circuit board 304, while remaining within the scope of the present disclosure as well. Furthermore, one of skill in the art in possession of the present disclosure will appreciate that the heat transfer described above may be performed by other configurations of heat transfer subsystems (e.g., including additional heat transfer subsystems other than those illustrated). As such, the number and configuration of heat transfer subsystems in the storage device 300 may be provided depending on the heat generation capabilities of the processing system 306, the expected heat required to allow write operations on the storage subsystem 310 (e.g., the expected ambient temperatures for the computing device 200), the heat transfer capabilities of the heat transfer subsystems, and/or other factors that would be apparent to one of skill in the art in possession of the present disclosure.

Figure 9A:
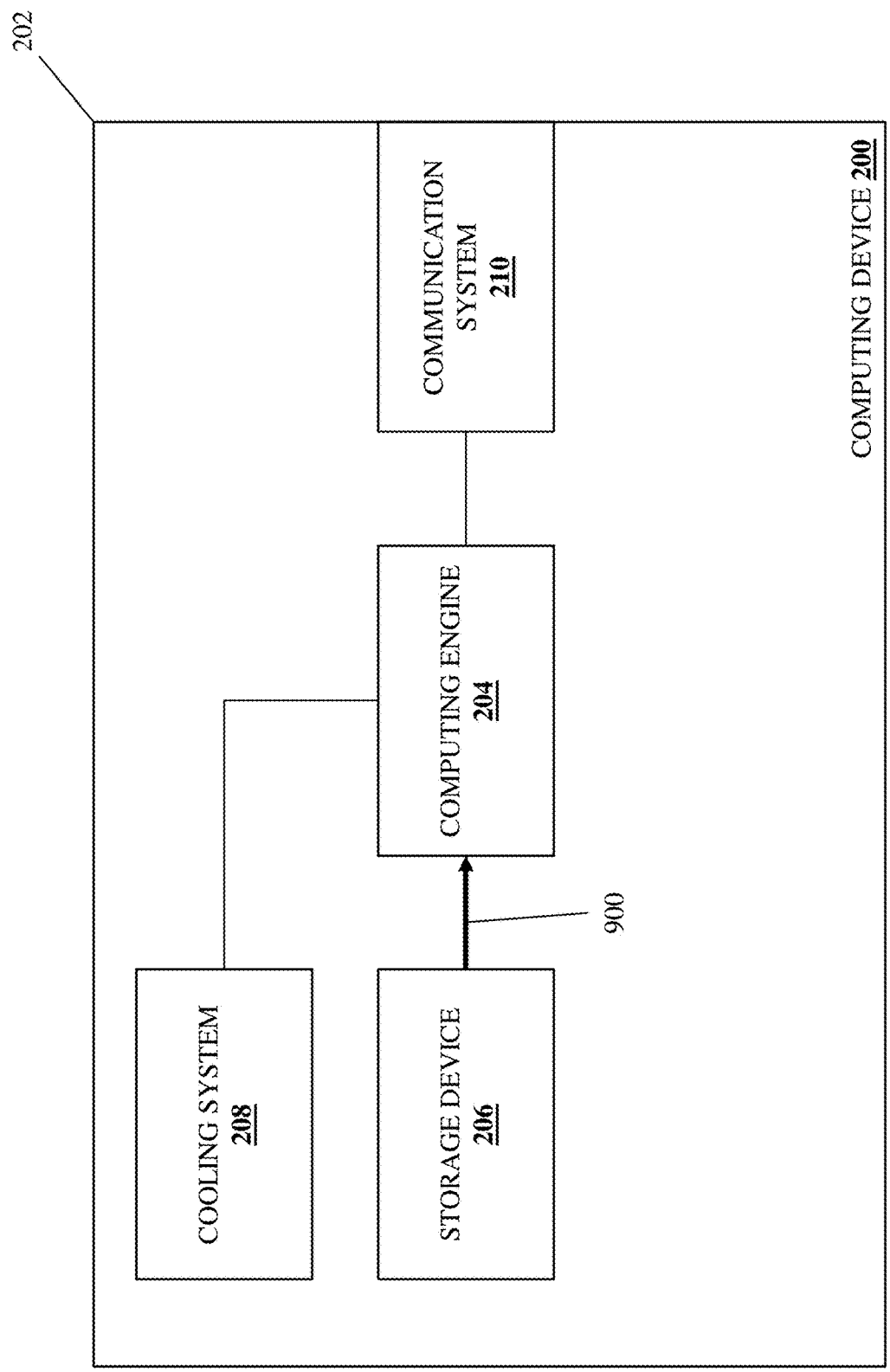
FIG. 9A is a schematic view illustrating an embodiment of the computing device of FIG. 2 operating during the method of FIG. 4.

With reference to FIGS. 9A and 9B, in some embodiments of the method 400, the storage device self-heating engine 309 in the storage device 206/300 may perform cooling system shut-off request operations 900 that may include generating and transmitting a cooling system shut-off request to the computing engine 204 in the computing device 200 that is configured to cause the computing engine 204 to stop the operation of the cooling system 208. For example, the cooling system 208 may be performing cooling operations to reduce the heat generated by components in the computing device, which may include cooling a Central Processing Unit (CPU), a Graphics Processing Unit (GPU), a memory system, a power supply, and/or other heat-producing components that would be apparent to one of skill in the art in possession of the present disclosure. However, while a specific example has been described in which a cooling system operates to cool components in a computing device, one of skill in the art in possession of the present disclosure will appreciate how a cooling system may be operating during the method 400 for other reasons that would fall within the scope of the present disclosure.

With reference to FIG. 9B, in response to receiving the cooling system shut-off request 900, the computing engine 204 may perform a cooling system shut-off operation 902 that may include generating and transmitting a cooling system shut-off instruction to the cooling system 208 that is configured to stop cooling operations being performed by the cooling system 208. For example, the cooling shut-off instruction may include instructions to shut down the cooling system until the cooling system receives an instruction to restart, instructions to shut down the cooling system intermittently, instructions to shut down the cooling system for a pre-determined amount of time (and then restart automatically), and/or to stop the operation of the cooling system in any other manner that would be apparent to one of skill in the art in possession of the present disclosure. Furthermore, while techniques for stopping the cooling system 208 have been described, one of skill in the art in possession of the present disclosure will appreciate how other techniques for stopping the cooling system will fall within the scope of the present disclosure.

Figure 10A:
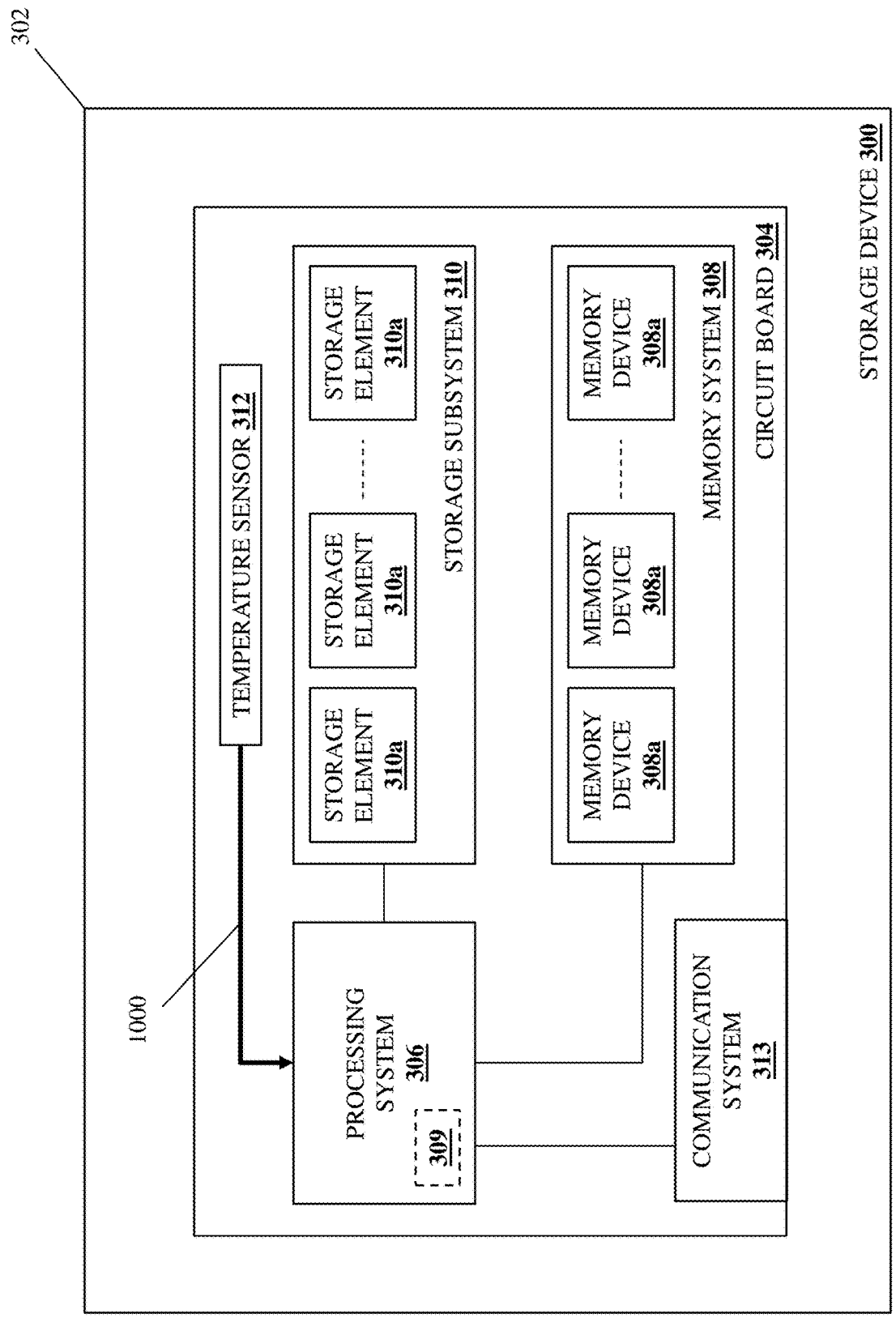
FIG. 10A is a schematic view illustrating an embodiment of the storage device of FIG. 3A operating during the method of FIG. 4.

The method 400 then proceeds to decision block 412 where it is determined whether the temperature of the storage subsystem is below the temperature threshold. As would be appreciated by one of skill in the art in possession of the present disclosure, in response to heat transfer operations 800 and/or 802 discussed above with reference to FIG. 8, the temperature in the storage element(s) 310*a* included in storage system 310 will increase, and the storage device self-heating system of the present disclosure may be configured to continue to transfer heat to the storage subsystem 310 until the storage element(s) 310*a* reach a temperature above the temperature threshold. As such, with reference to FIG. 10A and in an embodiment of decision block 412, the storage device self-heating engine 309 included in the processing system 306 may perform temperature determination operations 1000 that may include receiving or retrieving temperature information from the temperature sensor 314, and comparing that temperature information to a threshold temperature for performing a write operation similarly as discussed above with reference to decision block 404.

If, at decision block 412, it is determined that the temperature of the storage subsystem is below the temperature threshold, the method 400 returns to block 408. As such, the method 400 may loop through blocks 408 and 410 such that the storage device 300 performs the computations using the processing system 306 and generates heat that is transferred to the storage subsystem 310 via the heat transfer subsystem(s) as long as the temperature of the storage subsystem 310 is below the temperature threshold.

Figure 10B:
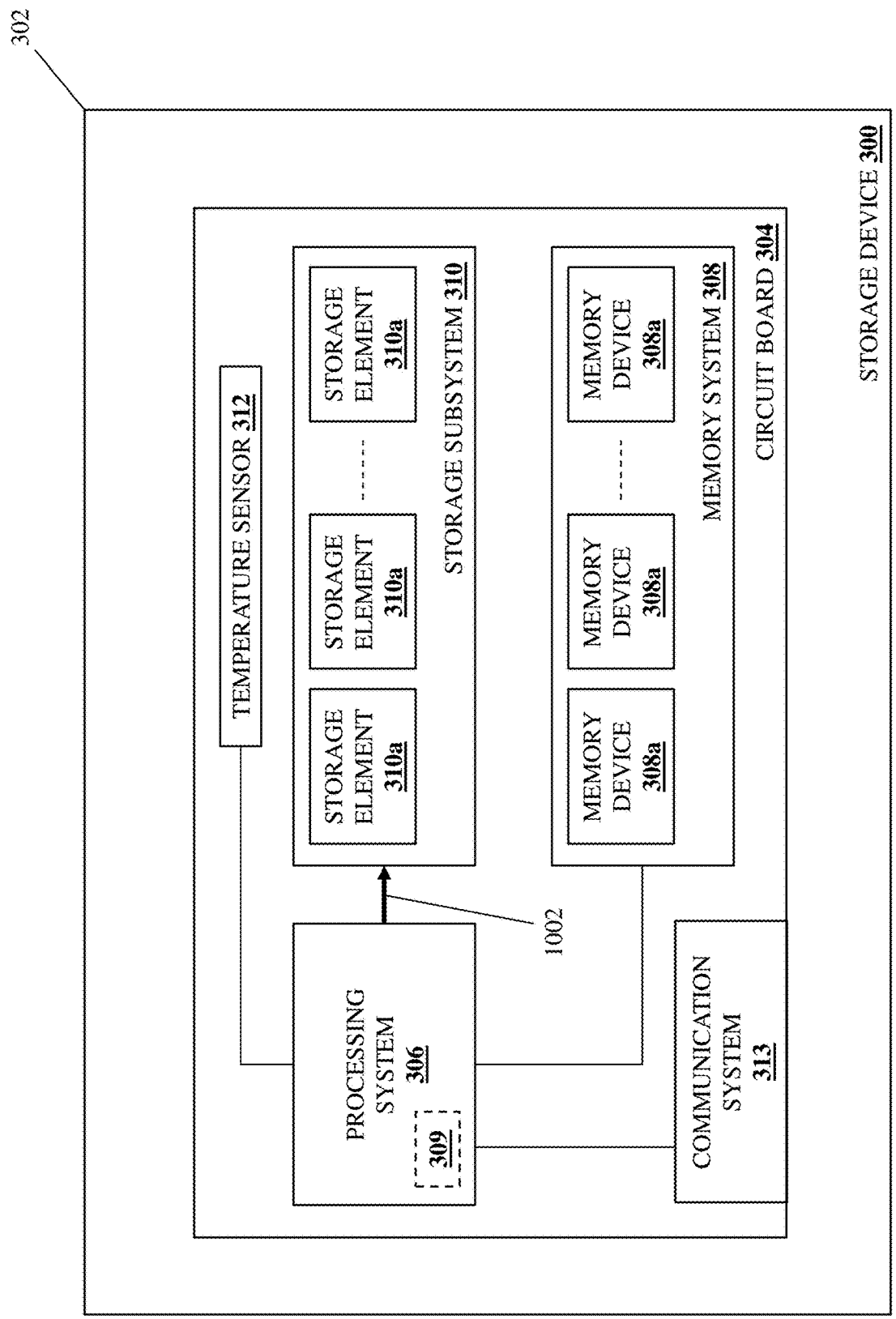
FIG. 10B is a schematic view illustrating an embodiment of the storage device of FIG. 3A operating during the method of FIG. 4.
Figure 10C:
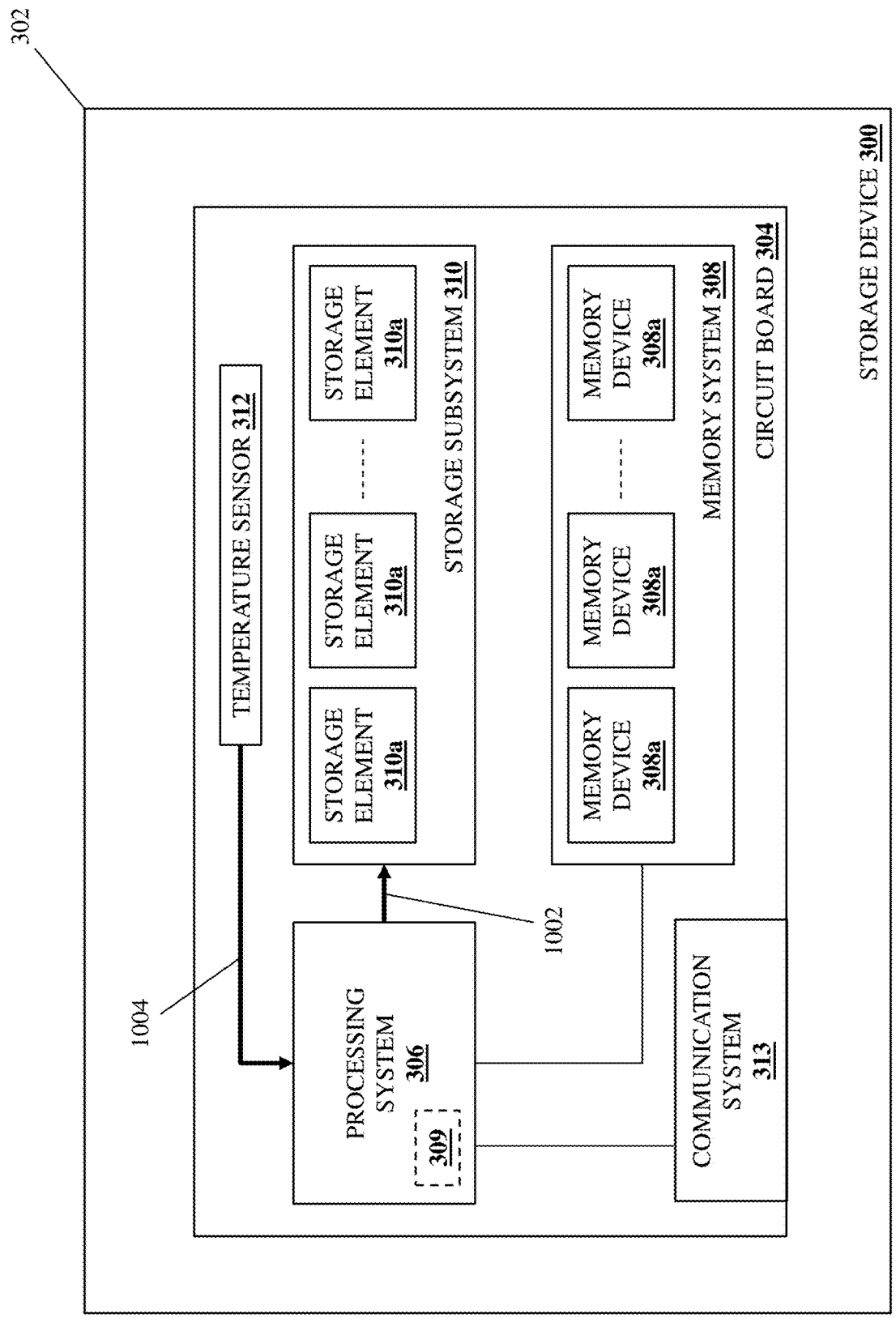
FIG. 10C is a schematic view illustrating an embodiment of the storage device of FIG. 3A operating during the method of FIG. 4.

If, at decision block 412, it is determined that the temperature of the storage subsystem is above the temperature threshold, the method 400 proceeds to block 414 where the storage device performs a write operation. With reference to FIG. 10B, in an embodiment of block 414 and in response to determining that the temperature of the storage subsystem 310 is above the temperature threshold, the processing system 306 may perform write operations 1002 which may include writing data to the storage subsystem 310 similarly as described above with reference to block 406. As such, the writing of the data as part of the write operation 1002 may be defined by the write instruction that was received at block 402, and as discussed above, while the write operation 1002 is described as being performed in response to write instructions received from the computing engine 204, write operations may be performed in response to write instructions received from other entities, or generated internally by one or more subsystems in the storage device 300 (e.g., as part of background operations in the storage device 206/300), while remaining within the scope of the present disclosure as well.

In some embodiments, in response to determining that the temperature of the storage subsystem is above the temperature threshold at decision block 412, the storage device self-heating engine 309 may stop the processing system 306 from performing the computations and generating heat for transfer to the storage subsystem 310. For example, while performing the write operations at block 414, the processing system 306 may require processing system resources for the execution of other storage device instructions, background operations, and/or other operations that would be apparent to one of skill in the art in the possession of the present disclosure. However, while one specific example of the stopping of heat generation via the processing system computations has been described, one of skill in the art in possession of the present disclosure will appreciate the processing system computations discussed above may be stopped for a variety of other reasons while remaining within the scope of the present disclosure as well.

As will be appreciated by one of skill in the art in possession of the present disclosure, when the storage device self-heating engine 309 stops performing the computations and generating heat, the temperature of the storage element(s) 310a in the storage subsystem 310 may decrease below the temperature threshold for performing the write operation before the write operation is complete. As discussed below, the storage device self-heating system may be configured to resume computations using the processing system 306 in such a situation to prevent write operations from being performed below the temperature threshold. However, in other embodiments, the storage device self-heating engine 309 may have the processing system 306 continue performing the computations to generate and transfer heat to the storage subsystem 310 until the write operations have completed to ensure that the temperature of storage subsystem 310 does not drop below the temperature threshold while performing those write operations. As will be appreciated by one of skill in the art in possession of the present disclosure, the processing system 306 may be configured split, share, or otherwise utilize its processing resources to perform the computations and the write operations at the same time, with the computation performance and/or the write operation performance reduced relative to situations in which all the processing resources are dedicated to one or the other.

The method 400 then proceeds to decision block 416 where it is determined whether the write operation is complete. In an embodiment, at decision block 416, the storage device self-heating engine 309 provided by the processing system 306 may determine whether the write operations associated with the write instructions received from computing engine 204 have been completed. As will be appreciated by one of skill in the art in possession of the present disclosure, in embodiments like those discussed above in which the storage device self-heating engine 309 has the processing system 306 continue performing the computations to generate and transfer heat to storage subsystem 310 until the write operations are complete, the write operations at block 414 may be performed until they are completed, and thus a determination will be made a decision block 416 that the write operation is complete, and the method 400 may return to block 402. However, in embodiments like those discussed above in which the storage device self-heating engine 309 stops the processing system 306 from performing the computations and generating heat that is transferred to the storage subsystem 310 once the storage subsystem 310 is above the temperature threshold, it is possible for the temperature of the storage subsystem 310 to drop below the temperature threshold during the write operations.

Thus, if at decision block 416 it is determined that the write operation is not complete, the method 400 may return to decision block 412 to check whether the temperature of the storage subsystem 310 has dropped below the temperature threshold during the write operations. As such, the method 400 may loop through decision block 412, block 414, and block 416 to continue to perform the write operation as long as the temperature of the storage subsystem 310 is above the temperature threshold, and until those write operations are determined to be completed at decision block 416 at which time the method 400 returns to block 402. However, in the event the storage device self-heating engine 309 determines at decision block 412 that the temperature of the storage subsystem 310 has decreased below the temperature threshold during the performance of the write operations, the method 400 may loop through blocks 408 and 410 to perform the computations using the processing system 306 to generate heat and transfer that heat via the heat transfer subsystem(s) to the storage subsystem 310 until the temperature of the storage subsystem 310 is above the temperature threshold for performing the write operations.

In some examples, in response to determining that the temperature of the storage subsystem 310 has dropped below the temperature threshold during the performance of the write operations, the storage device self-heating engine 309 may stop the processing system 306 from performing the write operation, and once the temperature of the storage subsystem 310 has increased above the temperature threshold (i.e., in response to the resuming of the performance of block 408 and 410 as discussed above), the storage device self-heating engine 309 may cause the processing system 306 to resume performing the write operations until those write operations are determined to be completed at decision block 416 and the method 400 returns to block 402. However, in other embodiments, the resuming of the performance of blocks 408 and 410 may occur in response to determining that the temperature of the storage subsystem 310 is decreasing towards the temperature threshold (i.e., prior to actually decreasing below that temperature threshold) in order to prevent the temperature of the storage subsystem 310 from actually dropping below that temperature threshold such that the write operation being performed by the processing system 306 does not need to be interrupted.

Thus, systems and methods have been described that provide an SSD storage device that, in the event a write instruction is received when its NAND storage subsystem is below a temperature threshold, performs a plurality of computations using its processing system to generate heat that is then transferred via its heat transfer subsystem to heat the NAND storage subsystem above the temperature threshold. For example, the storage device self-heating system of the present disclosure may include an SSD storage device having a processing system, a NAND storage subsystem, and at least one heat transfer subsystem coupled between the processing system and the NAND storage subsystem. The SSD storage device determines that a temperature of the NAND storage subsystem is below a temperature threshold and, in response, uses the processing system to perform a plurality of computations that are configured to generate an amount of heat that, when transferred via the heat transfer subsystem(s), raises the temperature of the NAND storage subsystem. The heat transfer subsystem(s) transfer heat generated via the performance of the plurality of computations to the NAND storage subsystem, and when the SSD storage device determines that the temperature of the NAND storage subsystem is above the temperature threshold, it performs at least one storage operation. As such, SSD storage devices provided in relatively extreme cold environments (e.g., below OC) may use their existing processing systems and heat transfer subsystems to generate heat and transfer that heat to their NAND storage subsystems in order to heat those NAND storage subsystems to a temperature threshold prior to performing a write on those NAND storage subsystems in order to reduce errors that may otherwise occur with data written at such relatively extreme cold environments.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A storage device self-heating system, comprising:
   a computing device; and
   a storage device that is included in the computing device, includes a processing system, a storage subsystem, and at least one heat transfer subsystem that is coupled to each of the processing system and the storage subsystem, wherein the storage device is configured to:
      determine that a temperature of the storage subsystem is below a temperature threshold;
      perform, using the processing system and in response to determining that the temperature of the storage subsystem is below the temperature threshold, a plurality of computations that are configured to generate an amount of heat that, when transferred via the at least one heat transfer subsystem, will raise the temperature of the storage subsystem;
      transfer, from the processing system to the storage subsystem via the at least one heat transfer subsystem, first heat generated in response to the processing system performing the plurality of computations;
      determine that the temperature of the storage subsystem is above the temperature threshold; and
      perform, in response to determining that the temperature of the storage subsystem is above the temperature threshold, at least one storage operation.

2. The system of claim 1, wherein the temperature threshold is 0 degrees Celsius.

3. The system of claim 1, wherein the plurality of computations include tight loop computations that are performed iteratively on an instruction set.

4. The system of claim 1, wherein the at least one heat transfer subsystem includes at least one of:
   a heat transfer device that engages each of the processing system and the storage subsystem; and
   at least one conductive layer in a circuit board that is coupled to each of the processing system and the storage subsystem.

5. The system of claim 1, wherein the at least one storage operation includes a program/write operation.

6. The system of claim 1, wherein the storage device is configured to:
   determine, while performing the at least one storage operation, that a temperature of the storage subsystem has reduced below the temperature threshold;
   pause, in response to determining that the temperature of the storage subsystem has reduced below the temperature threshold, the at least one storage operation;
   perform, using the processing system and while pausing the at least one storage operation, the plurality of computations;
   transfer, from the processing system to the storage subsystem via the at least one heat transfer subsystem, second heat generated in response to the processing system performing the plurality of computations;
   determine that the temperature of the storage subsystem is above the temperature threshold; and
   resume, in response to determining that the temperature of the storage subsystem is above the temperature threshold, the at least one storage operation.

7. An Information Handling System (IHS), comprising:
   a storage processing system; and
   a storage memory system that is coupled to the storage processing system and that includes instructions that, when executed by the storage processing system, cause the storage processing system to provide a self-heating engine that is configured to:
      determine that a temperature of a storage subsystem is below a temperature threshold;
      perform, using the storage processing system and in response to determining that the temperature of the storage subsystem is below the temperature threshold, a plurality of computations that are configured to generate an amount of heat that, when transferred via at least one heat transfer subsystem coupled to each of the storage processing system and the storage subsystem, will raise the temperature of the storage subsystem;
      determine that the temperature of the storage subsystem is above the temperature threshold in response to the at least one heat transfer subsystem transferring, from the storage processing system to the storage subsystem, first heat generated in response to the processing system performing the plurality of computations; and
      perform, in response to determining that the temperature of the storage subsystem is above the temperature threshold, at least one storage operation.

8. The IHS of claim 7, wherein the temperature threshold is 0 degrees Celsius.

9. The IHS of claim 7, wherein the plurality of computations include tight loop computations that are performed iteratively on an instruction set.

10. The IHS of claim 7, wherein the at least one heat transfer subsystem includes at least one of:
    a heat transfer device that engages each of the processing system and the storage subsystem; and
    one conductive layer in a circuit board that is coupled to each of the processing system and the storage subsystem.

11. The IHS of claim 7, wherein the at least one storage operation includes a program/write operation.

12. The IHS of claim 7, wherein the self-heating engine is configured to:
    determine, while performing the at least one storage operation, that a temperature of the storage subsystem has reduced below the temperature threshold;
    pause, in response to determining that the temperature of the storage subsystem has reduced below the temperature threshold, the at least one storage operation;
    perform, using the processing system and while pausing the at least one storage operation, the plurality of computations;
    transfer, from the processing system to the storage subsystem via the at least one heat transfer subsystem, second heat generated in response to the processing system performing the plurality of computations;
    determine that the temperature of the storage subsystem is above the temperature threshold; and
    resume, in response to determining that the temperature of the storage subsystem is above the temperature threshold, the at least one storage operation.

13. The IHS of claim 7, wherein the self-heating engine is configured to:
  transmit, in response to determining that the temperature of the storage subsystem is below the temperature threshold, instructions that are configured to cause a computing device to reduce the operation of a cooling system that is configured to cool the storage subsystem.

14. A method for a self-heating a storage device, comprising:
  determining, by a storage device, that a temperature of a storage subsystem in the storage device is below a temperature threshold;
  performing, by the storage device using a storage processing system in the storage device and in response to determining that the temperature of the storage subsystem is below the temperature threshold, a plurality of computations that are configured to generate an amount of heat that, when transferred via at least one heat transfer subsystem in the storage device that is coupled to each of the storage processing system and the storage subsystem, will raise the temperature of the storage subsystem;
  transferring, by the storage device from the storage processing system to the storage subsystem via the at least one heat transfer subsystem, first heat generated in response to the processing system performing the plurality of computations;
  determining, by the storage device, that the temperature of the storage subsystem is above the temperature threshold; and
  performing, by the storage device in response to determining that the temperature of the storage subsystem is above the temperature threshold, at least one storage operation.

15. The method of claim 14, wherein the temperature threshold is 0 degrees Celsius.

16. The method of claim 14, wherein the plurality of computations include tight loop computations that are performed iteratively on an instruction set.

17. The method of claim 14, wherein the at least one heat transfer subsystem includes at least one of:
  a heat transfer device that engages each of the processing system and the storage subsystem; and
  one conductive layer in a circuit board that is coupled to each of the processing system and the storage subsystem.

18. The method of claim 14, wherein the at least one storage operation includes a program/write operation.

19. The method of claim 14, further comprising:
  determining, by the storage device while performing the at least one storage operation, that a temperature of the storage subsystem has reduced below the temperature threshold;
  pausing, by the storage device in response to determining that the temperature of the storage subsystem has reduced below the temperature threshold, the at least one storage operation;
  performing, by the storage device using the processing system and while pausing the at least one storage operation, the plurality of computations;
  transferring, by the storage device from the processing system to the storage subsystem via the at least one heat transfer subsystem, second heat generated in response to the processing system performing the plurality of computations;
  determining, by the storage device, that the temperature of the storage subsystem is above the temperature threshold; and
  resuming, by the storage device in response to determining that the temperature of the storage subsystem is above the temperature threshold, the at least one storage operation.

20. The method of claim 14, further comprising:
  transmitting, by the storage device in response to determining that the temperature of the storage subsystem is below the temperature threshold, instructions that are configured to cause a computing device to reduce the operation of a cooling system that is configured to cool the storage subsystem.

* * * * *